United States Patent
Trajkovic et al.

(10) Patent No.: US 10,140,496 B2
(45) Date of Patent: Nov. 27, 2018

(54) SYSTEM FOR AND METHOD OF STITCHING BARCODE FRAGMENTS OF A BARCODE SYMBOL TO BE READ IN AN IMAGING-BASED PRESENTATION WORKSTATION

(71) Applicants: Miroslav Trajkovic, East Setauket, NY (US); Heng Zhang, Setauket, NY (US)

(72) Inventors: Miroslav Trajkovic, East Setauket, NY (US); Heng Zhang, Setauket, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 380 days.

(21) Appl. No.: 14/557,976

(22) Filed: Dec. 2, 2014

(65) Prior Publication Data

US 2018/0300519 A1    Oct. 18, 2018

(51) Int. Cl.
    *G06K 7/14*    (2006.01)

(52) U.S. Cl.
    CPC ......... *G06K 7/1491* (2013.01); *G06K 7/1417* (2013.01); *G06K 7/1465* (2013.01)

(58) Field of Classification Search
    CPC ... G06K 7/1491; G06K 7/1417; G06K 7/1465
    See application file for complete search history.

(56) References Cited

U.S. PATENT DOCUMENTS

| | | | |
|---|---|---|---|
| 5,418,862 A * | 5/1995 | Zheng | G06K 7/1092 235/462.1 |
| 5,444,231 A | 8/1995 | Shellhammer | |
| 5,821,519 A | 10/1998 | Lee et al. | |
| 7,213,759 B2 * | 5/2007 | Reichenbach | G06K 7/14 235/375 |
| 8,150,163 B2 | 4/2012 | Krupps | |
| 8,500,001 B2 | 8/2013 | Chiou et al. | |
| 8,636,217 B2 | 1/2014 | Saunders et al. | |
| 8,678,286 B2 | 3/2014 | Smith et al. | |
| 9,361,499 B2 * | 6/2016 | Bachelder | G06K 7/1465 |
| 2005/0224581 A1 | 10/2005 | Reichenbach et al. | |
| 2011/0102542 A1 | 5/2011 | Chen et al. | |
| 2013/0306733 A1 | 11/2013 | Tonouchi et al. | |
| 2014/0144987 A1 | 5/2014 | Shi | |
| 2014/0270539 A1 * | 9/2014 | Wang | G06K 7/1491 382/198 |

(Continued)

FOREIGN PATENT DOCUMENTS

EP    1469420    10/2004

OTHER PUBLICATIONS

"Fast Corner Detection" by Miroslav Trajkovic and Mark Hedley, University of Sydney, Sydney, Australia dated Mar. 21, 1996.

(Continued)

*Primary Examiner* — Seung H Lee
(74) *Attorney, Agent, or Firm* — Yuri Astvatsaturov

(57) ABSTRACT

Barcode fragments of a barcode symbol to be read by an imaging-based presentation workstation are stitched together by capturing a plurality of images, each containing a barcode fragment and a plurality of features located adjacent to the barcode fragment. The features in each captured image are detected and matched. The barcode fragments are stitched together based on the matched features in the captured images. The barcode symbol is read from the stitched barcode fragments.

20 Claims, 3 Drawing Sheets

(56) References Cited

U.S. PATENT DOCUMENTS

2018/0218190 A1* 8/2018 Nadabar ............ G06K 7/10861

OTHER PUBLICATIONS

"Motion Analysis of Monocular Video Sequences" Thesis submitted by Miroslav Trajkovic to University of Sydney, Sydney, Australia dated Mar. 1999.
International Search Report and Written Opinion dated Feb. 18, 2016 in counterpart PCT application PCT/US2015/055862.
Office Action for Australian Patent Application No. 2015355532 dated Apr. 9, 2018.

* cited by examiner

SYSTEM FOR AND METHOD OF STITCHING BARCODE FRAGMENTS OF A BARCODE SYMBOL TO BE READ IN AN IMAGING-BASED PRESENTATION WORKSTATION

BACKGROUND OF THE INVENTION

The present disclosure relates generally to a system for, and a method of, stitching barcode fragments of a barcode symbol to be read in an imaging-based presentation workstation of particular benefit when the barcode fragments have repetitive patterns of bars and spaces.

Point-of-transaction workstations employing imaging-based readers have been used in many venues, such as supermarkets, department stores and other kinds of retail settings, as well as libraries and parcel deliveries and other kinds of public settings, as well as factories, warehouses and other kinds of industrial settings, for many years. Such workstations were often configured either as stand-mounted scanners each having a presentation window; or as vertical slot scanners each having a generally vertically arranged, upright presentation window; or as flat-bed or horizontal slot scanners each having a generally horizontally arranged presentation window; or as bioptical, dual window scanners each having both a generally horizontal presentation window and a generally vertically arranged, upright presentation window. Such workstations were often operated to electro-optically read a plurality of symbol targets, such as one-dimensional symbols, particularly Universal Product Code (UPC) barcode symbols, truncated symbols, stacked symbols, and two-dimensional symbols, as well as non-symbol targets, such as driver's licenses, receipts, signatures, etc., the targets being associated with, or borne by, objects or products to be processed by, e.g., purchased at, the workstations.

A user, such as an operator or a customer, slid or swiped a product associated with, or bearing, the target in a moving direction across and past a respective presentation window in a swipe mode, or momentarily presented, and steadily momentarily held, the target associated with, or borne by, the product to an approximate central region of the respective presentation window in a presentation mode. The products could be moved relative to the respective window in various directions, for example, from right-to-left, or left-to-right, and/or in-and-out, or out-and-in, and/or high-to-low, or low-to-high, or any combination of such directions, or could be positioned either in contact with, or held at a working distance away from, either window during such movement or presentation. The choice depended on the type of the workstation, or on the user's preference, or on the layout of the venue, or on the type of the product and target. Return light returning from the target in the imaging-based reader was captured in one or more images, and then processed, and, when the target was a symbol, was decoded, and read, thereby identifying the product.

Although generally satisfactory for their intended purpose, one issue with such known presentation-type workstations involved the fact that not every image contained an entire barcode symbol and, hence, the symbol could not be read from a single image containing an incomplete symbol. During movement of a product past a window, each image captured by a single solid-state imager or camera positioned behind the window did not necessarily contain the entire symbol. In bioptical workstations, the images captured by multiple imagers or cameras positioned behind different windows likewise did not necessarily contain the entire symbol because, among other things, the product was moving, the imagers were looking in different directions, and the fields of view of the imagers were relatively narrow in practice.

In such circumstances, it was generally known to stitch barcode fragments of the symbol from the captured images. A barcode stitching method was disclosed in U.S. Pat. No. 5,821,519, and general string and sequence- and character-matching algorithms were described in a book entitled *Algorithms on Strings, Trees, and Sequences: Computer Science and Computational Biology*, by Dan Gusfield, published by the Press Syndicate of the University of Cambridge, Cambridge, England, 1997. Yet, as satisfactory as such stitching methods have been, they sometimes failed, especially when the barcode fragments had repetitive patterns of bars and spaces. Such repetitive patterns, particularly, in the center regions of the barcode fragments, made it impossible to stitch the barcode fragments together.

Accordingly, there is a need to improve the stitching of barcode fragments, especially when the barcode fragments have repetitive patterns of bars and spaces, and to enhance the overall reading performance of imaging-based presentation workstations.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
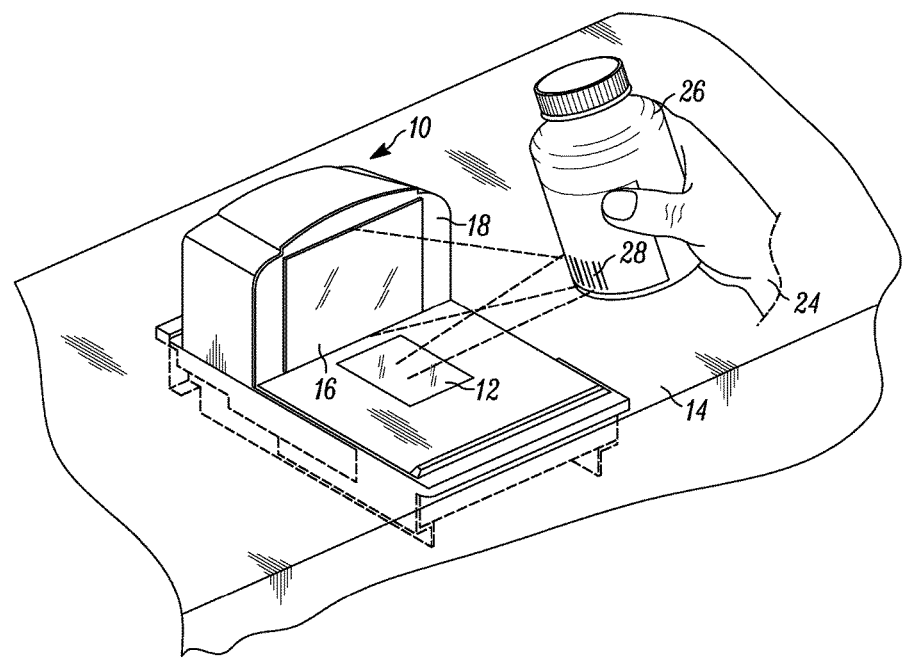
FIG. 1 is a perspective view of a bioptical presentation workstation for reading barcode symbols on products presented to the workstation in use.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The present disclosure relates, in accordance with one aspect, to a system for stitching barcode fragments of a barcode symbol to be read by an imaging-based presentation workstation, such as any of the workstations described above. The system includes an imaging assembly supported by the workstation, and operative for capturing a plurality of images. Each image contains a barcode fragment and a plurality of features located adjacent to the barcode fragment. Advantageously, these features constitute two-dimensional, visible markers that are external to the barcode symbol and that are spaced apart outside of the barcode symbol. The imaging assembly may preferably include either a single solid-state imager for capturing the plurality of images over a field of view at different times, or a plurality of solid-state imagers for simultaneously capturing the plurality of images over different fields of view.

The system further includes a controller or programmed microprocessor for detecting the plurality of features in each captured image, for matching the plurality of features in the captured images, for stitching the barcode fragments together based on the matched features in the captured images, and for reading the barcode symbol from the stitched barcode fragments. The controller has, or accesses, a memory in which the plurality of images are stored.

A method, in accordance with another aspect of this disclosure, of stitching barcode fragments of a barcode symbol to be read by an imaging-based presentation workstation, is performed by capturing a plurality of images, each containing a barcode fragment and a plurality of features located adjacent to the barcode fragment. The plurality of features in each captured image is detected, and then matched. The method is further performed by stitching the barcode fragments together based on the matched features in the captured images. The barcode symbol from the stitched barcode fragments is then read.

In use, stitching of the barcode fragments is initially performed by using sequence or character matching techniques. If that attempt fails, for example, due to repetitive patterns of bars and spaces in the barcode fragments, then the features in the captured images are detected and matched, and the stitching is performed based on the matched features. Repetitive patterns of bars and spaces in the barcode fragments are no longer a stumbling block that causes reading to fail. Overall reading performance is enhanced.

Figure 2:
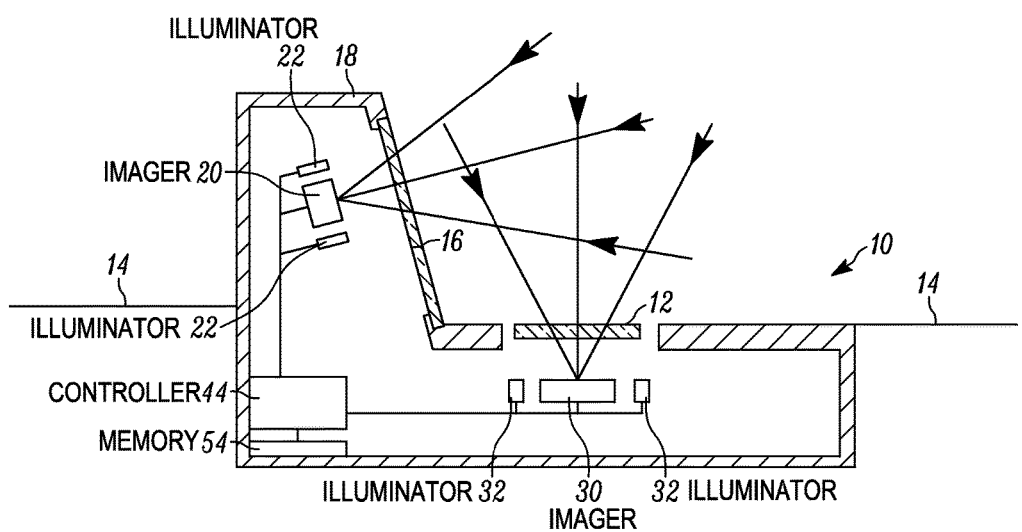
FIG. 2 is a schematic diagram depicting components of the workstation of FIG. 1.

Turning now to the drawings, FIGS. 1-2 depict a dual window, bi-optical, point-of-transaction workstation 10 situated on a counter 14. Although a bi-optical workstation has been illustrated, it will be understood that other types of workstations, including any of the above-described workstations having at least one presentation window, could be employed. The workstation 10 is used by retailers at the checkout counter 14 to process transactions involving the purchase of products 26 bearing, or associated with, an identifying target, such as the UPC barcode symbol 28 described above. As best seen in FIGS. 1-2, the workstation 10 has a generally horizontal, light-transmissive window 12 elevated, or set flush with, a top surface of the respective counter 14, and a vertical or generally vertical, i.e., tilted, (referred to as "upright" hereinafter) light-transmissive window 16 set flush with, or recessed into, a raised housing portion 18 above the counter 14.

As schematically shown in FIG. 2, an imaging assembly advantageously includes a first camera or solid-state imager 20 located behind the upright window 16, and a second camera or solid-state imager 30 located behind the horizontal window 12. Each imager 20, 30 is a solid-state device, for example, a charge coupled device (CCD) or a complementary metal-oxide-semiconductor (CMOS) device and has a linear or area array of addressable image sensors or pixels, preferably of submegapixel or supermegapixel size, having a field of view that diverges away from its associated window in both horizontal and vertical directions. The imagers 20, 30 have respective illuminators 22, 32 to uniformly illuminate the symbol 28. The imagers 20, 30 are operative for capturing return illumination light passing through either or both windows 12, 16 from the symbol 28 on the product 26.

In use, a user 24, such as a clerk or a customer, processes each product 26 bearing the symbol 28 thereon, past the windows 12, 16 by swiping the product 26 across a respective window, or by presenting the product 26 by holding it momentarily steady at the respective window. The symbol 28 may be located on any of the top, bottom, right, left, front and rear, sides of the product, and at least one, if not more, of the imagers 20, 30 will capture the illumination light reflected, scattered, or otherwise returning from the symbol 28 through one or both windows 12, 16 as one or more images.

The imagers 20, 30 and the associated illuminators 22, 32 are operatively connected to a programmed workstation microprocessor or controller 44 operative for controlling the operation of these and other components. Preferably, the controller 44 is tasked with processing the return light scattered from the symbol 28, and with decoding the captured image of the return light. A memory 54 is operatively bidirectionally connected to the controller 44. In operation, the controller 44 sends control signals to energize the illuminators 22, 32 for a short time period of, for example, 500 microseconds or less, and to energize the imagers 20, 30 to collect illumination light reflected and/or scattered from the symbol 28 substantially only during said time period. A typical imager needs about 16-33 milliseconds to read the entire target image and operates at a frame rate of about 30-90 frames per second. The memory 54 can buffer multiple images of the symbol 28 captured over successive frames.

As previously explained, not every image captured by the imagers 20, 30 contained the entire barcode symbol 28 and, hence, the symbol 28 could not be read from a single image containing an incomplete symbol. During movement of the product 26 past the windows 12, 16, each image captured by the imagers 20, 30 did not necessarily contain the entire symbol 28 because, among other things, the product 26 was moving, the imagers 20, 30 were looking in different directions, and the fields of view of the imagers 20, 30 were relatively narrow in practice.

Figure 4:
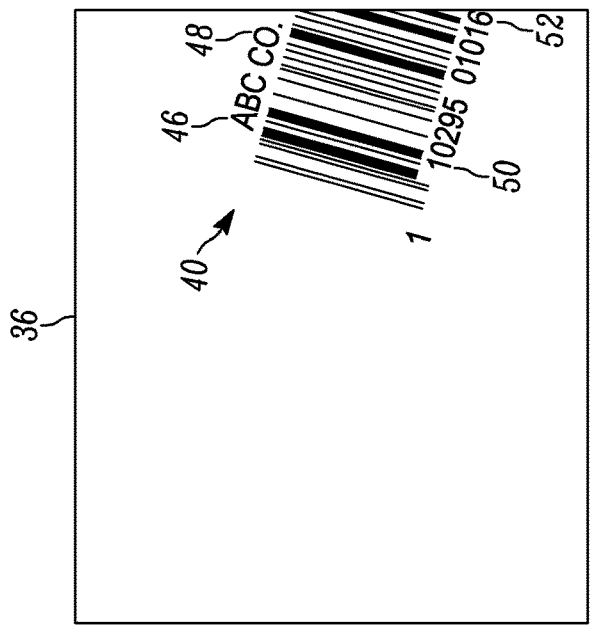
FIG. 4 is a second image captured by the workstation of FIG. 1.
Figure 3:
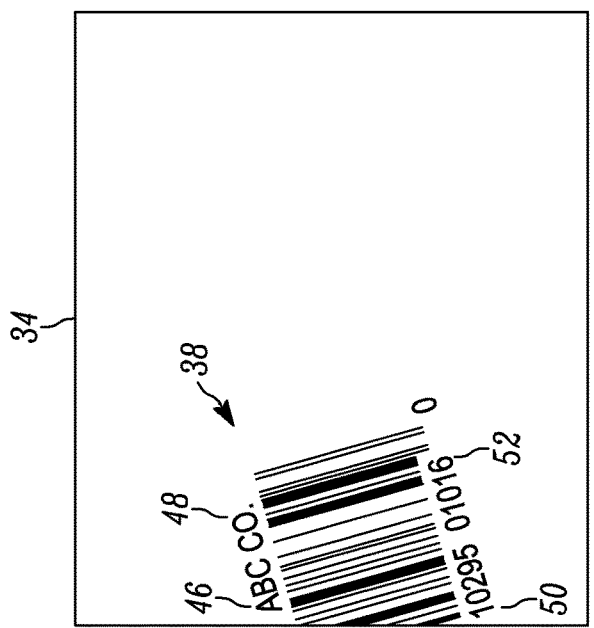
FIG. 3 is a first image captured by the workstation of FIG. 1.

FIG. 3 depicts an image 34 taken by the imager 20, and FIG. 4 depicts another image 36 taken by the imager 30. The images 34, 36 can either be taken from the different imagers 20, 30 at the same time, or the images 34, 36 can be taken from a single imager, but at different times. Each image 34, 36 contains a barcode fragment 38, 40, respectively, and a plurality of features 46, 48, 50, 52, as described more fully below, located adjacent to the barcode fragments 38, 40. The fragment 38 includes the right end region of the symbol 28, while the fragment 40 includes the left end region of the symbol 28. The barcode fragments 38, 40 have repetitive patterns of bars and spaces, e.g., the numerals "0" and "1" are repeated. Each image 34, 36 is incomplete, i.e., the entire symbol 28 is not contained therein.

To stitch the barcode fragments 38, 40 together from the captured images 34, 36, the controller 44 detects the plurality of features 46, 48, 50, 52 in each captured image 34, 36. The features 46, 48, 50, 52 are two-dimensional, visible markers external to the symbol 28, and preferably spaced apart of one another and arranged around the symbol 28. The features can be any alphabetic letter, e.g., the feature 46 is the letter "A", and the feature 48 is the letter "O", or any numeral, e.g., the feature 50 is the numeral "1", and the feature 52 is the numeral "6". The features need not only be alphabetical or numerical characters, but could be any graphic, such a star or a logo, or any geometrical figure. Preferably, each feature has a corner, i.e., a place or angle where two sides or edges meet. Features, such as ISBN numbers or logos, are routinely printed alongside symbols on labels applied to products. Although four features have been illustrated, this is merely exemplary, because any number of such features can be utilized. A feature detection algorithm suitable for this purpose is described in a paper by Trajkovic, M. et al., *Fast Corner Detection*, Image and Vision Computing, vol. 16, pp. 75-87, 1998, the entire contents of said paper being hereby incorporated herein by reference thereto.

The controller 44 is then operative for matching the plurality of features 46, 48, 50, 52 in the captured images 34, 36. A matching algorithm suitable for this purpose is described in a paper by Trajkovic, M., *Motion Analysis of Monocular Video Sequences*, Department of Electrical Engineering, University of Sydney, pp. 45-46, 1999, the entire contents of said paper being hereby incorporated herein by reference thereto.

The controller 44 is then operative for stitching the barcode fragments 38, 40 together based on the matched features 46, 48, 50, 52 in the captured images 34, 36. Finally, once the barcode fragments 38, 40 have been stitched together, the symbol 28 is read by the controller 44.

Figure 5:
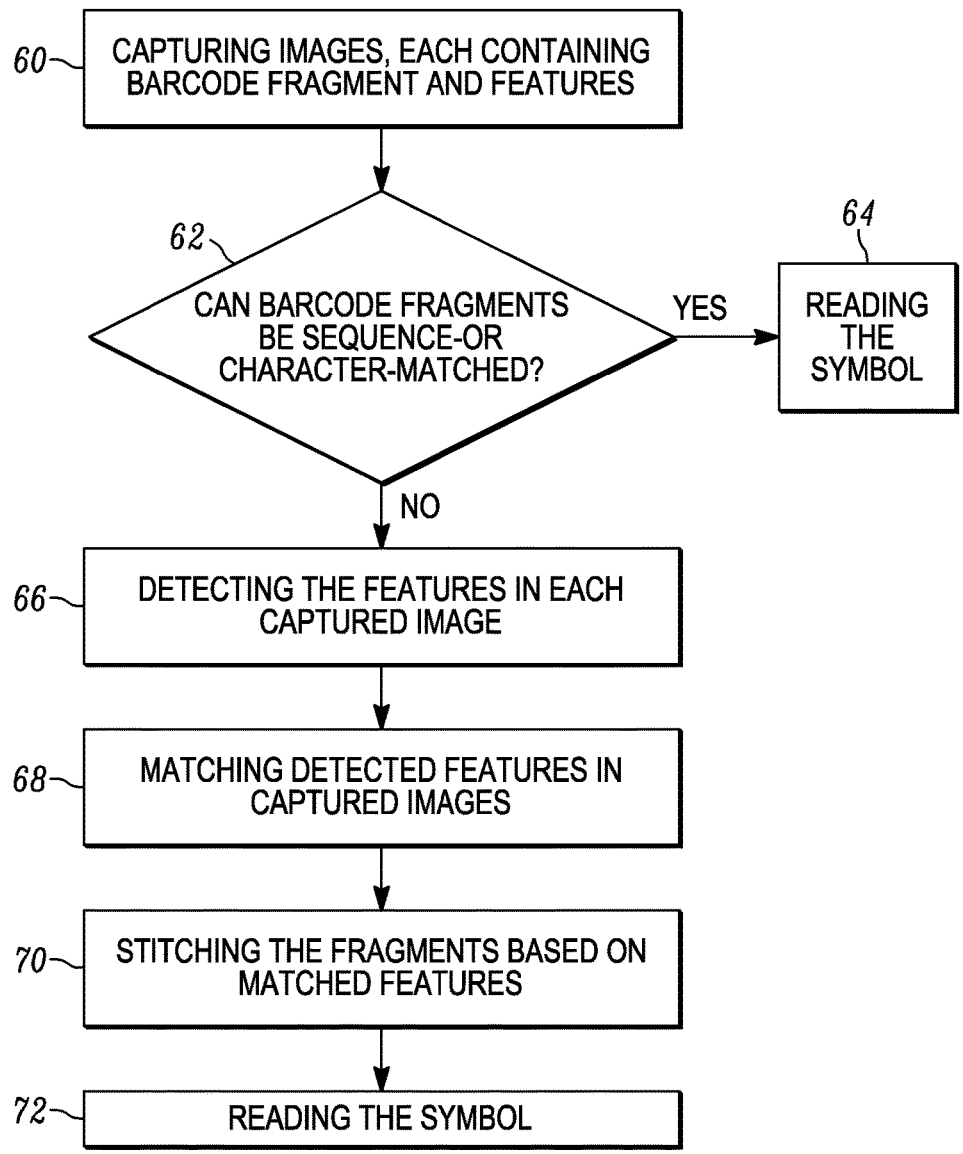
FIG. 5 is a flow chart depicting steps performed in stitching barcode fragments of a barcode symbol to be read in the workstation of FIG. 1 in accordance with the method and system of the present disclosure.

FIG. 5 depicts a flow chart that summarizes the reading method in a workstation. The method is performed by capturing a plurality of images 34, 36 in step 60. Each image contains a barcode fragment 38, 40 and a plurality of features 46, 48, 50, 52 located adjacent to the barcode fragment 38, 40. The controller 44 then determines, in step 62, if the barcode fragments 38, 40 can be stitched together using sequence- or character-matching techniques. If so, then the barcode symbol from the stitched barcode fragments 38, 40 is read in step 64. If not, for example, due to the presence of repetitive patterns of bars and spaces in the fragments 38, 40, then the method is further performed by detecting the plurality of features 46, 48, 50, 52 in each captured image 34, 36 in step 66, and by matching the plurality of features 46, 48, 50, 52 in the captured images 34, 36 in step 68. Then, the barcode fragments 38, 40 are stitched together based on the matched features 46, 48, 50, 52 in the captured images 34, 36 in step 70. Finally, the barcode symbol from the stitched barcode fragments 38, 40 is read in step 72.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A system for stitching barcode fragments of a barcode symbol to be read by an imaging-based presentation workstation, comprising:
    an imaging assembly supported by the workstation, for capturing a plurality of images, each containing a barcode fragment and a plurality of features located adjacent to the barcode fragment; and
    a controller for detecting the plurality of features in each captured image, for matching the plurality of features in the captured images, for stitching the barcode fragments together based on the matched features in the captured images, and for reading the barcode symbol from the stitched barcode fragments.

2. The system of claim 1, wherein the imaging assembly includes a solid-state imager for capturing the plurality of images over a field of view at different times.

3. The system of claim 1, wherein the imaging assembly includes a pair of solid-state imagers for simultaneously capturing the plurality of images over different fields of view.

4. The system of claim 3, wherein one of the pair of solid-state imagers is situated behind a generally horizontal, light-transmissive, presentation window of the workstation, and wherein the other of the pair of solid-state imagers is situated behind a generally upright, light-transmissive, presentation window of the workstation.

5. The system of claim 1, wherein the controller has a memory in which the plurality of images are stored.

6. The system of claim 1, wherein each feature is a two-dimensional, visible marker external to the barcode symbol.

7. The system of claim 1, wherein the features are spaced apart outside of the barcode symbol.

8. The system of claim 1, wherein the features are printed alongside the barcode symbol.

9. A system for stitching barcode fragments of a barcode symbol to be read by an imaging-based bioptical workstation having a generally horizontal, light-transmissive, presentation window and a generally upright, light-transmissive, presentation window, comprising:
    an imaging assembly in the workstation and including one solid-state imager behind the generally horizontal window, and another solid-state imager behind the generally upright window, the imagers being operative for simultaneously capturing a plurality of images over different fields of view, each image containing a barcode fragment and a plurality of features located adjacent to the barcode fragment; and
    a controller for detecting the plurality of features in each captured image, for matching the plurality of features in the captured images, for stitching the barcode fragments together based on the matched features in the captured images, and for reading the barcode symbol from the stitched barcode fragments.

10. The system of claim 9, wherein each feature is a two-dimensional, visible marker external to the barcode symbol.

11. The system of claim 9, wherein the features are spaced apart outside of the barcode symbol.

12. The system of claim 9, wherein the features are printed alongside the barcode symbol.

13. A method of stitching barcode fragments of a barcode symbol to be read by an imaging-based presentation workstation, comprising:
    capturing a plurality of images, each containing a barcode fragment and a plurality of features located adjacent to the barcode fragment;
    detecting the plurality of features in each captured image;
    matching the plurality of features in the captured images;
    stitching the barcode fragments together based on the matched features in the captured images; and
    reading the barcode symbol from the stitched barcode fragments.

14. The method of claim 13, wherein the capturing of the plurality of images is performed by a solid-state imager over a field of view at different times.

15. The method of claim 13, wherein the capturing of the plurality of images is performed by simultaneously capturing the plurality of images over different fields of view of a pair of solid-state imagers.

16. The method of claim 15, and situating one of the pair of solid-state imagers behind a generally horizontal, light-transmissive, presentation window of the workstation, and situating the other of the pair of solid-state imagers behind a generally upright, light-transmissive, presentation window of the workstation.

17. The method of claim 13, and storing the plurality of images in a memory.

18. The method of claim 13, and configuring each feature as a two-dimensional, visible marker external to the barcode symbol.

19. The method of claim 13, and spacing the features apart outside of the barcode symbol.

20. The method of claim 13, and printing the features alongside the barcode symbol.

* * * * *